(12) United States Patent
Doran et al.

(10) Patent No.: US 8,387,074 B2
(45) Date of Patent: Feb. 26, 2013

(54) ENTERPRISE DIRECTORY SERVICE

(75) Inventors: James R. Doran, New Milford, CT (US); Paul William Everett, Endicott, NY (US); Gordan G. Greenlee, Endicott, NY (US); Ashraf N. Ibrahim, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 3012 days.

(21) Appl. No.: 10/037,175

(22) Filed: Nov. 9, 2001

(65) Prior Publication Data

US 2003/0093583 A1 May 15, 2003

(51) Int. Cl.
*G06F 3/00* (2006.01)
(52) U.S. Cl. ........................ 719/328; 719/330
(58) Field of Classification Search ................ 719/328, 719/330
See application file for complete search history.

(56) References Cited

U.S. PATENT DOCUMENTS

| | | | |
|---|---|---|---|
| 4,453,217 A | 6/1984 | Boivie | 364/300 |
| 5,600,835 A | 2/1997 | Garland et al. | 395/605 |
| 5,742,769 A | 4/1998 | Lee et al. | 395/200.36 |
| 5,813,006 A | 9/1998 | Polnerow et al. | 707/10 |
| 5,822,526 A | 10/1998 | Waskiewicz | 395/200.36 |
| 5,826,258 A * | 10/1998 | Gupta et al. | 707/4 |
| 5,873,080 A * | 2/1999 | Coden et al. | 707/3 |
| 6,075,851 A | 6/2000 | Pinard et al. | 379/199 |
| 6,223,145 B1 | 4/2001 | Hearst | 703/22 |
| 6,230,188 B1 | 5/2001 | Marcus | 709/206 |
| 6,282,537 B1 * | 8/2001 | Madnick et al. | 707/4 |
| 6,343,287 B1 * | 1/2002 | Kumar et al. | 707/4 |
| 6,356,906 B1 * | 3/2002 | Lippert et al. | 707/10 |
| 6,430,556 B1 * | 8/2002 | Goldberg et al. | 707/4 |
| 6,457,142 B1 * | 9/2002 | Klemm et al. | 714/38.12 |
| 6,665,662 B1 * | 12/2003 | Kirkwood et al. | 707/3 |
| 6,748,386 B1 * | 6/2004 | Li | 707/10 |
| 2002/0133504 A1 * | 9/2002 | Vlahos et al. | 707/104.1 |
| 2005/0278692 A1 * | 12/2005 | Sridhar et al. | 717/106 |

OTHER PUBLICATIONS

Luqi, Naval Postgraduate School Monterey, California, Sep. 2001.*
Fredrik Olsson, Reusing Swedish Language Processing Resouce in SVENSK, 1996.*
Carl-Fredrik Sorensen, DIF8901 Object-Oriented Systems, 2001.*
IBM TDB, "Voice Recognition Workstation Phone System," Mar. 1994, pp. 479-480.

* cited by examiner

*Primary Examiner* — Lechi Truong
(74) *Attorney, Agent, or Firm* — John Pivnichny

(57) ABSTRACT

An apparatus and method provides directory service to software applications throughout an enterprise. Directory entries are kept in a data store. A web server having one or more API's is coupled to the data store. The web server may have an API locator for selecting an appropriate API. An enterprise software application such as a purchasing or accounts payable transaction requests directory information by sending a query to an appropriate wrapper based on the programming language, protocol or format of the application. The wrapper sends the request to the appropriate API which then sends a request to the data store. A directory entry is received and returned to the enterprise.

22 Claims, 3 Drawing Sheets

ENTERPRISE DIRECTORY SERVICE

TECHNICAL FIELD

The invention relates to apparatus and methods for providing directory service to user applications. In particular the invention relates to use of a web server having an API (application programming interface) coupled to a data store of directory entries and a wrapper for accepting queries from a user application.

BACKGROUND OF THE INVENTION

Computer programs for looking up names in a directory are used throughout businesses, organizations, and even by the general public such as looking up a person's telephone number using a search engine on the World Wide Web. Initially programs required that a person's name be spelled correctly in order for a search to be successful. However, various improvements have been developed to provide an improved and less strict capability.

Richard H. Boivie in U.S. Pat. No. 4,453,217 describes a spelling correction arrangement for finding the name in the directory that most closely resembles the name requested by the user. Assuming the desired name is in a directory, three possibilities one correct and two in error are recursively investigated. A count is kept of the number of errors for each possibility. Those with a higher number of errors than an earlier encountered possibility with a lower number of errors, are discarded leading eventually to the closest matching name. The user may also request any number of additional close names.

Garland et al. in U.S. Pat. No. 5,600,835 describe a method of performing a "fuzzy" search for a text string in a stored document. A dissimilarity value is generated for selected text strings from the document based on rules defining differences from a text string query and a weighting value indicating the relative importance of the rule. The selected text strings may then be displayed in order based on their dissimilarity values. The user chooses the correct string and the weighting values are accordingly adjusted based on the user choice.

Marti A. Hearst in U.S. Pat. No. 6,223,145 B1 describes a user interface for creating a search query for documents. The invention uses a cone tree generation method and a category hierarchy. There is a two way interaction with the user with the method suggesting related categories which may be unfamiliar to the user. A search query is generated based on user interaction with a display of suggested categories.

Another type of directory lookup searches for an e-mail address for a particular name. If a person wishes to receive e-mail messages from senders without revealing his/her email address, a directory service as described by Lee et al. in U.S. Pat. No. 5,742,769 may be used. The directory service has a database of records of user's e-mail addresses. When a request to send an e-mail to a user is received, the service determines whether or not the user's e-mail address is to be displayed. If not, the service sends the message to the intended recipient without providing the recipient's e-mail address to the requester.

Edward Waskiewicz in U.S. Pat. No. 5,822,526 describes an email directory using proxy addresses associated with e-mail addresses to facilitate the transfer from one e-mail system to another across a gateway.

Kevin Marcus in U.S. Pat. No. 6,230,188 B1 describes another method of protecting the privacy of a person's e-mail address. When a request is received for a person's email address, a proxy address is displayed in lieu of the person's actual email address. The sender is then enabled to send an email message to the party without knowing the person's actual email address.

Polnerow et al. in U.S. Pat. No. 5,813,006 describe a method and system of directory service which permits users to retrieve records without authenticating the requesting user. However, if the user wishes to modify a record, such as to update or correct his own listing, then the user can register with the service and upon authentication is permitted to access the user's own record to modify the information that is already present.

Pinard et al. in U.S. Pat. No. 6,075,851 describe a method of routing calls based on a relationship or organization roles. Relationships of organizational roles are stored in a database including names and directory numbers of persons filling said roles and alternative numbers of temporary persons associated with the roles. In response to a request to complete a call to a directory number associated with a role, the call is processed to an alternate directory number instead of the requested directory number.

In an article titled "Voice Recognition Workstation Phone System," published in the IBM Technical Disclosure Bulletin of March 1994, pages 479-80 there is described a system for directory lookup combining voice recognition techniques with a language translation program. The system is therefore able to respond to spoken requests and spoken commands.

Within a business enterprise, in addition to user's needs to query a directory as described above, there are many software applications running either in real time or periodically which need some of the same directory type of information as is provided by the user query system. None of the above-described developments address the unique challenges presented by such needs. In accordance with the teachings of the present invention, there is defined a new enterprise directory service which provides a capability for satisfying such needs. It is believed that this invention constitutes a significant advancement in the directory service art.

OBJECTS AND SUMMARY OF THE INVENTION

It is therefore, a principal object of the present invention to enhance the directory service art by providing a system with enhanced capabilities.

It is another object to provide a system wherein enhanced operational capabilities are possible.

It is a further object to provide a method of providing enhanced directory service to a user application.

These and other objects are attained in accordance with one embodiment of the invention wherein there is provided an enterprise directory service apparatus, comprising, a data store having a plurality of directory entries, a web server having an API coupled to the data store, for sending a query to the data store and receiving a directory entry, and a wrapper coupled to the API for accepting the query from a user application.

In accordance with another embodiment of the invention there is provided a method of providing directory service to a user application, the method comprising the steps of, providing a data store having a plurality of directory entries, providing a web server having an API coupled to the data store and a wrapper coupled to the API, receiving at the wrapper a query from a user application, and in response thereto sending the query from the wrapper to the API and thereafter to the data store, and receiving at the API a directory entry from the data store in response to the query, and sending the directory entry to the user application.

In accordance with yet another embodiment of the invention there is provided a computer program product for instructing a processor to provide enterprise directory service, the computer program product comprising, a computer recordable medium, first program instruction means for providing a data store having a plurality of directory entries, second program instruction means for providing a web server having an API coupled to the data store and a wrapper coupled to the API, third program instruction means for receiving at the wrapper a query from a user application, and in response thereto sending the query from the wrapper to the API and thereafter to the data store, and fourth program instruction means for receiving at the API a directory entry from the data store in response to the query, and sending the directory entry to the user application, and wherein all the program instruction means are recorded on the medium.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
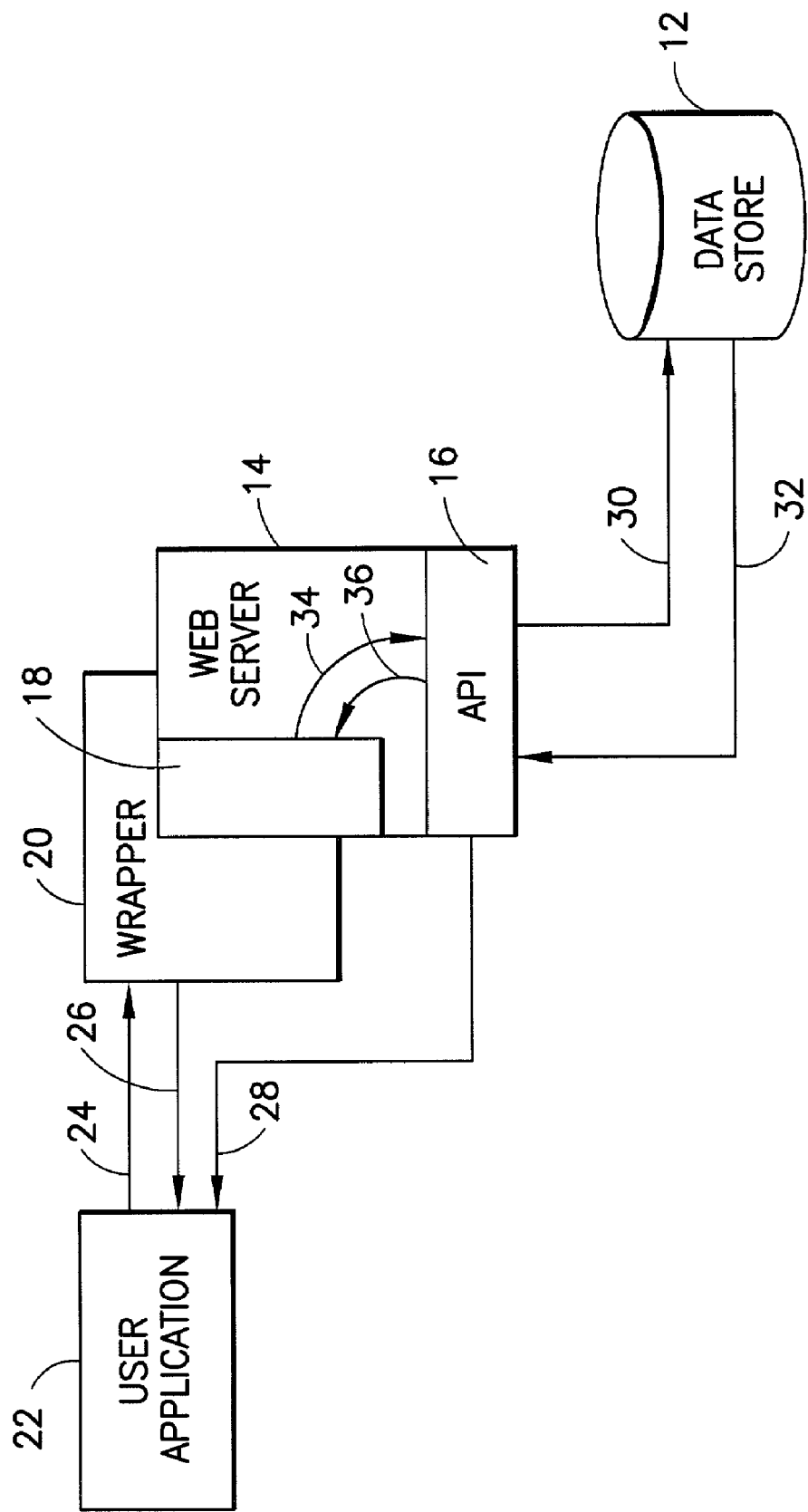
FIG. 1 illustrates the various elements of an enterprise directory service system in accordance with one embodiment of the invention.

In FIG. 1 there is shown an enterprise service apparatus. Data store 12 has a plurality of directory entries. The data store 12 may be any type of recordable media including but not limited to DASD (direct access storage device), floppy disk, CD ROM, DVD, semiconductor memory, or magnetic tape along with a drive or other apparatus for accessing data in the directory entries. The data store may be either rewritable media, or read-only. If read-only then the directory entries have to be placed on the media by some process other than use of the drive or apparatus used for access. The directory entries on data store 12 may be stored in a relational database such as DB2® (DB2 is a trademark of IBM Corp.). The entries may also be stored using the LDAP (Lightweight Directory Access Protocol) standard. LDAP as used herein is defined by RFC1777 March 1995 of the IETF (Internet Engineering Task Force).

Data store 12 is coupled bidirectionally with couplings 30 and 32 to a web server 14. Any type of processor or group of processors with appropriate software may be used for web server 14. An API (application programming interface) 16 and API Locator 18 are software shown as residing on web server 14. API 16 may also reside on a different web server (not shown). Data store 12 may also reside on web server 14 in which case couplings 30 and 32 represent internal data buses within web server 14. If data store 12 is located remotely, couplings 30 and 32 may be any interconnect hardware and protocol known in the art for connecting a remote data store to a web server processor such as a network, dial up, satellite, wireless. Data store 12 may also be distributed across multiple interconnected locations including distribution across various sites within an enterprise.

In operation, API 16 receives a query directed by API locator 18 over path 34 and in response sends a query to data store 12 over coupling 30. A directory entry is received in response over coupling 32.

Web server 14 is coupled to wrapper 20 which is adapted to interface with user application 22 over paths 24 and 26. A wrapper as used herein shall be taken to mean software code which takes lower level information and makes it usable at a higher level. A wrapper may be a Java class. For example if user application 22 is a Java program or applet then wrapper 20 is adapted to handle Java language protocols and standards.

User application 22 may be any software application having a need for directory data such as directory entries on data store 12. For example, user application 22 may be an enterprise software application such as purchasing processing or an accounts payable transaction software application. User application 22 may be running on any compatible processor including running on web server 14. If user application 22 is running on a processor different from web server 14, then wrapper 20 may also be running on this different processor. A query is sent across path 24 to wrapper 20. The directory entry response may be routed from API 16 back through API locator 18, wrapper 20, and across return path 26. However, either API locator 18, or wrapper 20 or both may be bypassed such as shown with return path 28.

Paths 24, 26, and 28 are all data paths between user application 22 and wrapper 20 or API 16. Understandably, if all applications are running on the same processor, then paths 24, 26, and 28 are interapplication data paths. Numerous techniques are known to provide such data paths. In the case where user application 22 or wrapper 20 are running on different processors than API 16, then data connectivity hardware and software is used in implementing paths 24, 26, and 28 in a manner similar to couplings 30 and 32 described earlier.

Figure 2:
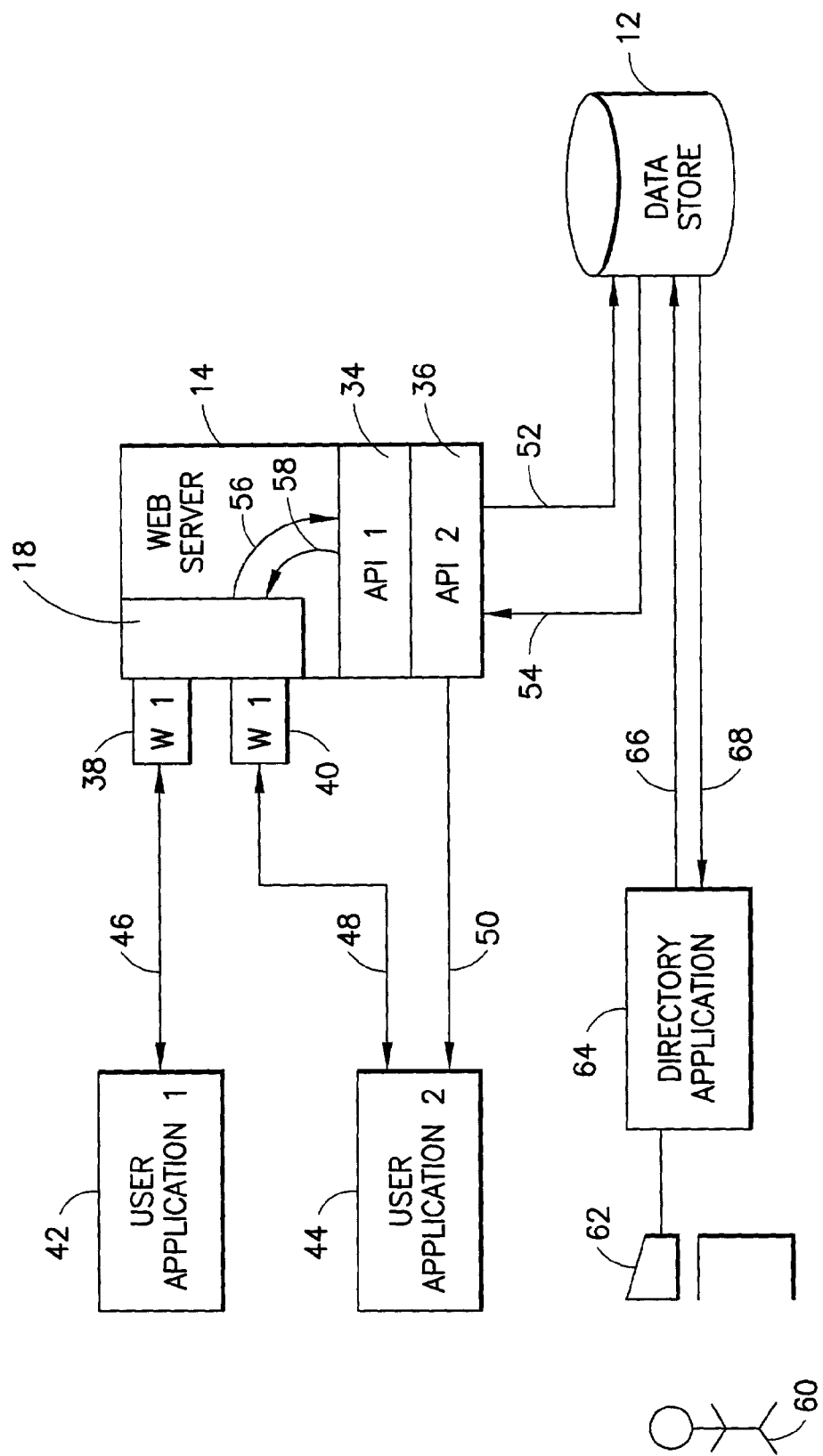
FIG. 2 illustrates another embodiment of the present invention.

In FIG. 2 there is shown another embodiment of the present invention having API 1 34 and API 2 36 running on web server 14. Data store 12 is accessed by both API 1 and API 2 using couplings 52 and 54. A query from user application 1 42 or user application 2 44 is sent over path 46 or 48 respectively to wrapper 1 38 or wrapper 2 40 respectively. For example user application 1 may be a Java based application and user application 2 may be a LOTUS SCRIPT® (LOTUS SCRIPT is a registered trademark of Lotus Development Corporation) based application. Wrapper 1 may be written to interface to Java applications and wrapper 2 written to interface to LOTUS SCRIPT® application. Other wrappers may interface to user applications specific to other programming languages such as the REXX programming language or the "C" programming language or other programming languages. API locator 18 accepts the query from wrapper 1 or wrapper 2, may perform some formatting, protocol, or programming language conversions, and locates the proper API, in this case either API 1 or API 2, to process the query. As in FIG. 1, API 1, or API 2 or both may be running on a web server different than web server 14 (not shown). The query is sent to data store 12 and a directory entry is received. The directory entry may then be sent to the requesting user application back through path 56, API locator 18, and the appropriate wrapper. Alternatively the appropriate API may bypass this string and send the directory entry directly e.g. over a path such as 50 shown in FIG. 2.

Data store 12 in FIG. 2 may also serve a conventional directory application 64. User 60 at workstation 62 requests a directory lookup using directory application 64 which, after some processing sends the lookup request on coupling 66 and receives a directory entry on coupling 68. The directory entry is presented to user 60 for example as text on a visual display of workstation 62.

An advantage of the present invention using wrappers is that a change in the structure or format of data store 12 can be easily made without affecting user applications 22, 42, or 44. However, conventional directory application 64 would require appropriate code changes to accommodate a change in data store 12.

Figure 3:
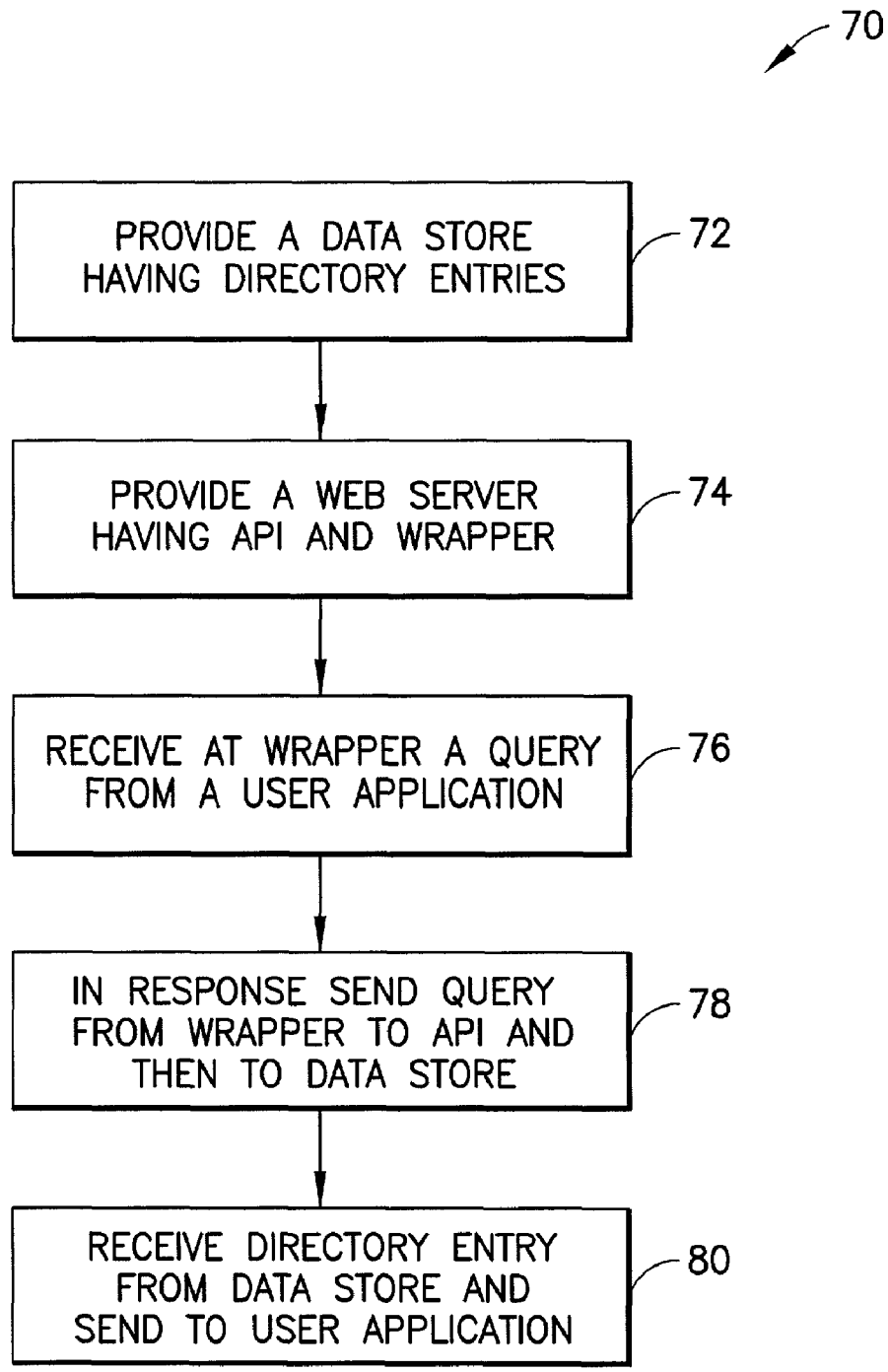
FIG. 3 is a flowchart depicting steps of another embodiment of the invention.

In FIG. 3 there is shown a flowchart 70 of steps comprising an embodiment of the present invention. In step 72 a data store having directory entries as explained above is provided. In step 74 a web server is provided having at least one API and at least one wrapper as defined above is also provided.

The wrapper may be running on the same web server as the API, or it may be running on another server interconnected therewith.

In step 76 a query for directory information is received at the wrapper from a software application. The software application may be running on any processor capable of sending a query to the wrapper including the web server provided in step 74.

In step 78 the wrapper sends the query on to the API which then sends it on to the data store provided in step 72. If more than one API are present on the web server, then an API locator receives the query from the wrapper and determines which API to send it to based on the formats, protocols, or programming languages used by the query. Both the wrapper and the API may process the query by altering its format, protocol, or programming language in order to facilitate the required interoperability. The API locator may designate the appropriate API using a uniform resource locator (URL) address.

In step 80 a directory entry is received from the data store and sent by the API to the user application either directly or indirectly such as back through the wrapper.

While there have been shown and described what are at present considered the preferred embodiments of the invention, it will be obvious to those skilled in the art that various changes and modifications may be made therein without departing from the scope of the invention as defined by the appended claims.

What is claimed is:

1. An enterprise directory service apparatus, comprising:
a data store memory having a plurality of directory entries;
a web server having an API coupled to said data store, for sending a query to said data store and receiving a directory entry; and
a wrapper coupled to said API adapted for accepting said query from a user application in a plurality of programming language.

2. The apparatus of claim 1, wherein said data store is a relational database.

3. The apparatus of claim 1, wherein said data store is an LDAP data store.

4. The apparatus of claim 1, wherein said web server has a plurality of API coupled to said data store, each API adapted to send said query to said data store and receive one of said plurality of directory entries.

5. The apparatus of claim 4, further comprising a plurality of wrappers each said wrapper coupled to one or more of said plurality of API, and each said wrapper adapted to accept said query from one of a plurality of user applications.

6. The apparatus of claim 5, further comprising an API locator on said web server for selecting one of said plurality of API in response to said query from one of said plurality of said user applications.

7. The apparatus of claim 1, wherein said API is adapted to receive one of said plurality of directory entries from said data store and send said one of said directory entries to said user application.

8. The apparatus of claim 7, wherein said API is adapted to send said one of said directory entries to said user application through said wrapper.

9. The apparatus of claim 7, wherein said API is adapted to receive said one of said plurality of directory entries in response to said query.

10. A method of providing directory service to a user application, said method comprising the steps of:
providing a data store having a plurality of directory entries;
providing a web server having an API coupled to said data store and a wrapper adapted to accent queries in a plurality of programming languages, coupled to said API;
receiving at said wrapper a query from a user application, and in response thereto sending said query from said wrapper to said API and thereafter to said data store; and
receiving at said API a directory entry from said data store in response to said query, and sending said directory entry to said user application.

11. The method of claim 10, wherein said data store is provided as a relational database.

12. The method of claim 10, wherein said data store is provided as a LDAP data store.

13. The method of claim 10, wherein said web server is provided having a plurality of API coupled to said data store, each API adapted to send said query to said data store and receive one of said plurality of directory entries.

14. The method of claim 13, further comprising the step of providing an API locator coupled to said wrapper and said plurality of API for determining to which one of said plurality of API said wrapper should send said query.

15. The method of claim 13, further comprising the step of providing a plurality of wrappers, each said wrapper coupled to one or more of said plurality of API, and each said wrapper adapted to accept said query from one of a plurality of user applications.

16. The method of claim 10, further comprising the step of receiving one of said plurality of directory entries from said data store and sending said one of said directory entries to said user application.

17. The method of claim 16, further comprising sending said one of said directory entries to said user application through said wrapper.

18. A computer system for providing enterprise directory service, said system comprising:
means for providing a data store memory having a plurality of directory entries;
means for providing a web server having an API coupled to said data store and a wrapper adapted to receive queries in a plurality of programming languages, coupled to said API;
means for receiving at said wrapper a query from a user application, and in response thereto sending said query from said wrapper to said API and thereafter to said data store; and
means for receiving at said API a directory entry from said data store in response to said query, and sending said directory entry to said user application.

19. The system of claim 18, further comprising an API locator on said web server for selecting said API in response to said query from said user application.

20. A computer program product for instructing a processor to provide enterprise directory service, said computer program product comprising:
   a non-transitory computer recordable medium:
   first program instruction means for providing a data store having a plurality of directory entries;
   second program instruction means for providing a web server having an API coupled to said data store and a wrapper adapted to receive queries in a plurality of programming languages, coupled to said API;
   third program instruction means for receiving at said wrapper a query from a user application, and in response thereto sending said query from said wrapper to said API and thereafter to said data store; and
   fourth program instruction means for receiving at said API a directory entry from said data store in response to said query, and sending said directory entry to said user application; and wherein
   all said program instruction means are recorded on said medium.

21. The computer program product of claim 19, further comprising fifth program instruction means for providing a wrapper coupled to said API for receiving said query from said user.

22. A method of deploying a directory service to a client, comprising the steps of:
   providing data storage service including a data store having a plurality of directory entries;
   providing a web service, said service capable of serving up web pages and having an API coupled to said data store and a wrapper adapted to receive queries in a plurality of programming languages, coupled to said API;
   receiving at said wrapper a query from a client application, and in response thereto sending said query from said wrapper to said API and thereafter to said data store; and
   receiving at said API a directory entry from said data store in response to said query, and sending said directory entry to said client application.

\* \* \* \* \*